United States Patent [19]

Champleboux et al.

[11] Patent Number: 4,895,185
[45] Date of Patent: Jan. 23, 1990

[54] EXPANDABLE HOSE DEVICE

[75] Inventors: Jacques J. Champleboux, Clermont-Ferrand; Bernard Ragout, Aubiere; Maurice Rouby, Lezoux, all of France

[73] Assignee: Caoutchouc Manufacture et Plastiques, Bezons, France

[21] Appl. No.: 143,958

[22] Filed: Jan. 14, 1988

Related U.S. Application Data

[63]* Continuation of Ser. No. 862,637, May 13, 1986, abandoned.

[30] Foreign Application Priority Data

May 14, 1985 [FR] France ............................... 85 07473

[51] Int. Cl.$^4$ ............................................. F16L 55/12
[52] U.S. Cl. .................................. 138/109; 138/174; 138/93
[58] Field of Search ............... 138/109, 110, 172, 174, 138/130, 93; 166/120, 122; 285/138, 149

[56] References Cited

U.S. PATENT DOCUMENTS

| 2,273,398 | 2/1942 | Couty et al. ........................ 285/908 |
| 3,834,965 | 9/1974 | Seiwart et al. ...................... 138/109 |
| 4,234,019 | 11/1980 | Hoknor et al. ..................... 138/109 |
| 4,467,836 | 8/1984 | Ragout ............................... 138/109 |
| 4,567,916 | 2/1986 | Antal et al. ........................ 138/109 |

Primary Examiner—James E. Bryant, III
Attorney, Agent, or Firm—Antonelli, Terry & Wands

[57] ABSTRACT

Device with flexible hose, particularly for an expandable packer, wherein hose is reinforced by armature layers made of flexible cables disposed helically and is attached at least at one end by compression of said layers against rigid pieces, characterized by the supporting elements and gripping elements, which are coaxial, having nonadhesive conical compression surfaces which diverge toward the end and by at least one wedge provided with slits being driven between reinforcing layers to ensure compression.

15 Claims, 3 Drawing Sheets

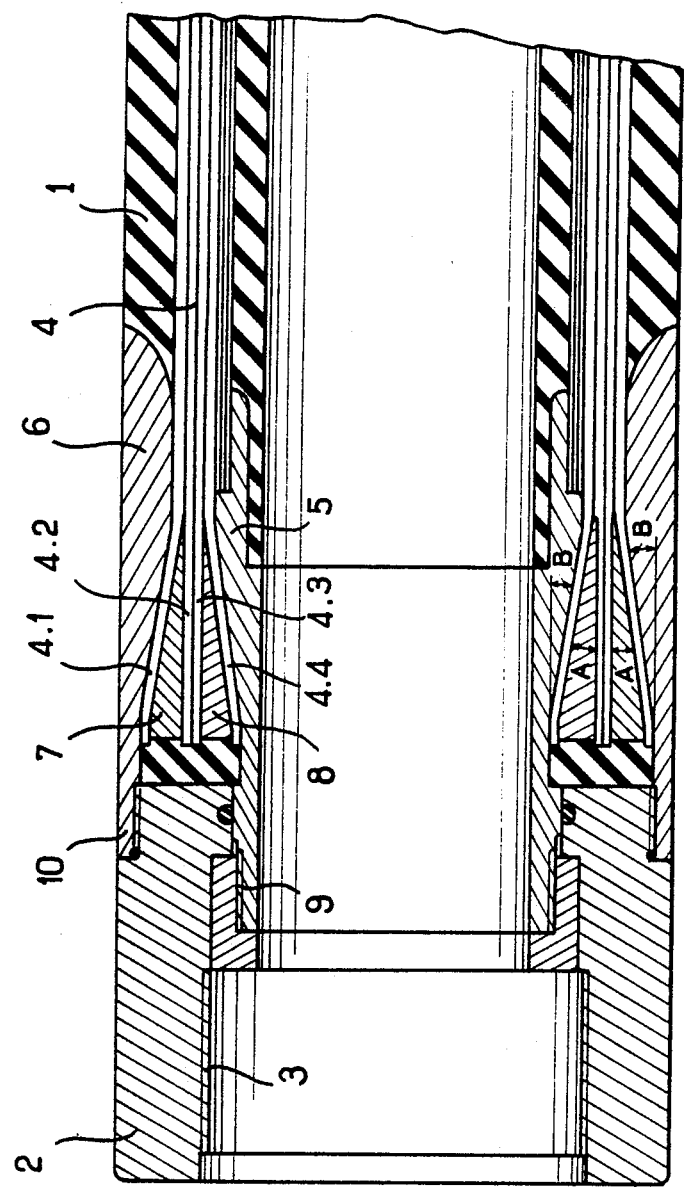
FIG_1

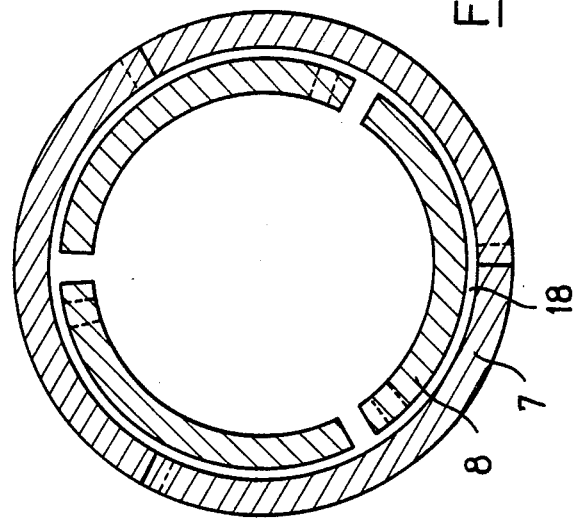
FIG._4
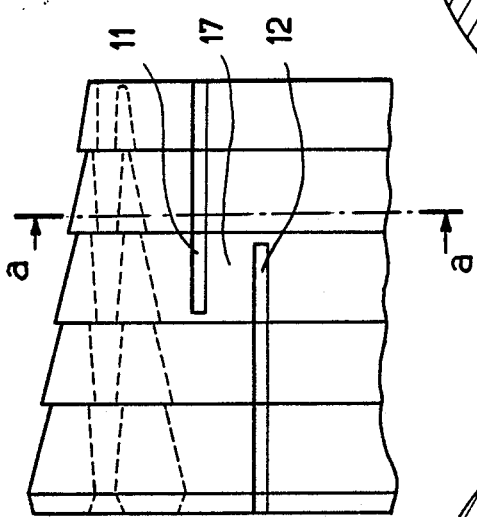
FIG._2
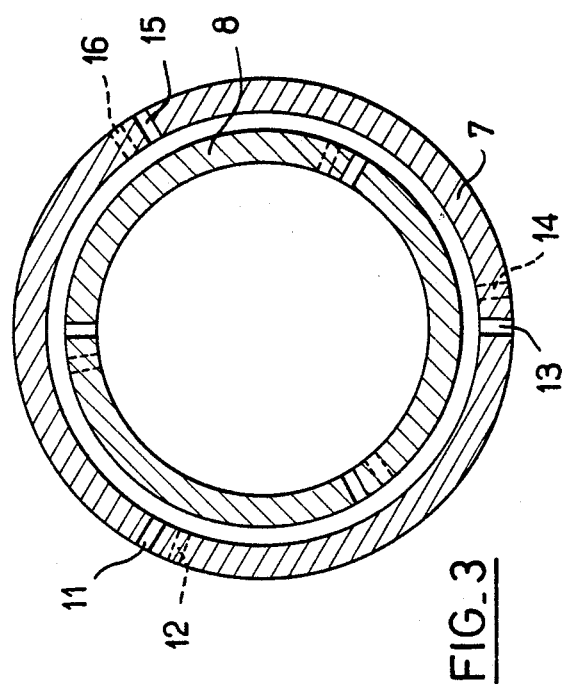
FIG._3

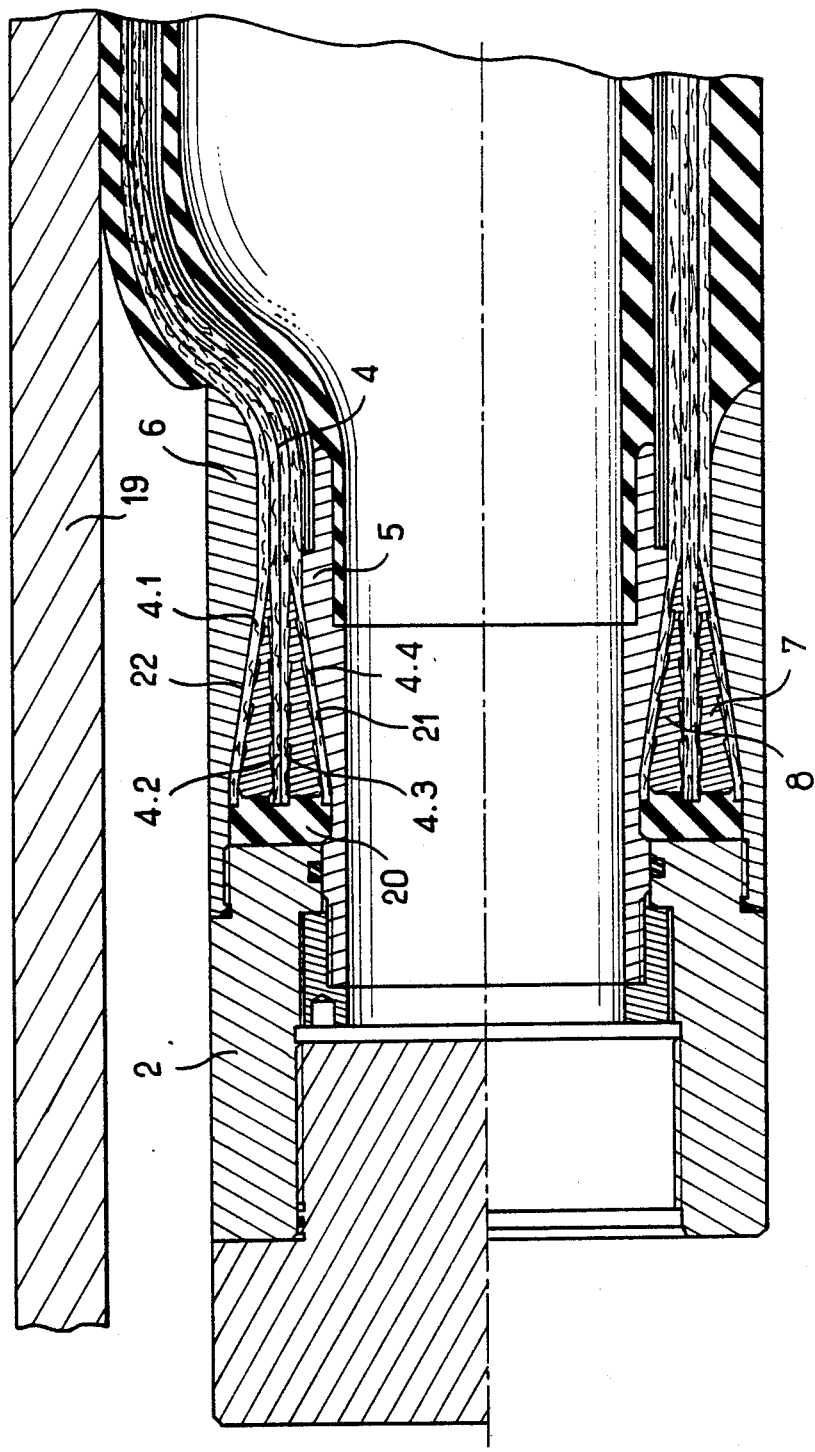

EXPANDABLE HOSE DEVICE

This is a continuation of application Ser. No. 862,637, filed May 13, 1986, now abandoned.

The principal patent U.S. Pat. No. 4,467,836 describes an expandable hose device for utilization in fields where very high performance levels are required. This is the case in particular for well packers (oil or other) where the fluids are at high pressure (e.g. 350 bars) and a high temperature (e.g. 120° C.). Packer systems using the properties of expandable hoses are well known and in common use; they exist in various forms for diameters as different as 50 mm or 800 mm. As an example, one may cite the devices according to U.S. Pat. No. 4,406,461, U.S. Pat. No. 4,310,161, or French Pat. No. 0.087867 which employ different technologies.

The goal of the invention, of which the principal patent describes one application, is to enable the performances of expandable packers to be considerably increased while preventing the armature, composed of hose-reinforcing elements, from separating from the end pieces which are essential to implement the principle of packing by expansion of the hose.

Indeed, the application of physical and mechanical principles shows that the performances attained by such devices depend mathematically on the intrinsic characteristics of the expandable hose armature as well as the quality of the link between said armature and the end pieces.

The linking quality QL is defined as the ration between the force F required to separate the armature from the end pieces and the breaking strength R of the armature. The linking quality $QL = F/R$ thus defines a linking efficiency; as an example, a link will be considered poor-quality if, for an intrinsic armature strength R of 100 daN, the armature separates from the end piece at a force F of 60 daN; the efficiency of the link will then be 0.60. Conversely, good linking quality will be attained when the efficiency is equal to or approximately equal to 1 under all circumstances.

In the case where the efficiency is equal to 1, separation necessarily causes the armature to break away from the end pieces.

The devices known to date, which employ crimping, gluing, or pinching—either separately or in combination—never yield efficiencies of 1 when the armatures have breaking strengths exceeding 10,000 daN per centimeter.

The device according to the invention allows the tearing, ungluing, or slipping phenomena which results fron the use of devices of the prior art to be avoided.

One solution for large-diameter hoses is the subject of the principal patent; it is principally adapted to diameters greater than 300 mm, a mean diameter at the level of the reinforcements. For medium- and small-diameter hoses, a solution with the same principle but different design is proposed. As in the invention described in the principal patent, the solution consists of providing a flexible hose device wherein the ends are secured in an extremely strong fashion to the rigid end pieces in order for the assembly to withstand very high forces, in particular very high pressures and temperatures.

In particular, the goal of the invention described is to provide a device wherein the hose is expandable to serve for packing bores and similar applications wherein the method of attachment of the hose to the rigid end pieces occurs without exceeding the hose outside diameter in order fully to utilize the expandability of said hose. In such a device, at least one end of the hose is attached, by compressing its reinforcing layers, between an inner supporting element and an outer gripping element, these two elements being coaxial, characterized by the inner supporting element and the outer gripping element having tapered, coaxial surfaces diverging toward the end of the device, and by at least one wedge being driven between the ends of the reinforcing layers to compress them respectively between said wedge(s) and the supporting and anchoring elements.

This arrangement differs from the system described in the principal patent in that it uses one or more cones distributed at the rate of one cone per pair of layers, alternately right and left. It allows excellent fastening of the end of the hose since, under the effect of the service pressure, the tension forces exerted on the reinforcing layers of the hose tend to drive the wedge(s) between said compressing surfaces and to produce an self-locking effect of these layers, both against the surfaces of the adjacent wedge or wedges and the surfaces of the inner supporting and gripping elements. Preferably, the angle at the vertex of the section of a wedge will have a small value, about 5°–15°, on both sides of the cylindrical surface passing through the vertex of the wedge. This arrangement in particular allows the rigid pieces to be given a sufficient cross section while keeping their diameters to a value equal to or slightly larger than that of the diameter of the hose body.

To make this arrangement even more effective, the supporting and compression forces of the layers are balanced between the surfaces of the elements, making possible an extension or contraction of the wedge or wedges by means of slits interrupting the circular cross section, while preventing too-great adhesion of the supporting element on the one hand and of the outer gripping element on the other hand from opposing the self-locking effect of the elements caused by the tension force of the reinforcing layers.

These means taken together act jointly to render the self-locking effect operative in proportion to the tension exerted by the reinforcing layers as soon as the armature is stressed by pressure when placed in service. Nonadhesion of said elements permits compression, which is automatically distributed and balanced. The slits in the wedge or wedges make possible contraction or expansion of said wedge or wedges.

Other characteristics and advantages of the invention will emerge from the detailed description of one embodiment illustrated by FIGS. 1 to 5.

FIG. 1 is a partially cut away elevation of one end of the packing device according to the invention, using two wedges, in the free, i.e. not expanded, state.

FIG. 2 is a partial view of the wedges showing the arrangement of the balancing slits in one wedge.

FIGS. 3 and 4 are partial cross-sectional views of the two-wedge device showing the positioning of the slits before and after placing the device subject of the invention in service.

FIG. 5 is a partial cross-sectional view of one end showing a method of implementing the invention. The upper half-cut-away portion shows a device with two wedges, in service, i.e. in the inflated state. The lower half-cut-away portion shows the same device with two wedges in the resting state in the absence of inflation.

The device illustrated in FIG. 1 essentially has a tubular sleeve (1) made of rubber, attached at each end to a rigid assembly (2), fastened by means such as threads (3) to a plug in the assembly (not shown) or any other means extending the device subject of the invention to participate in its implementation. The wall of rubber sleeve (1) is reinforced by layer pairs (4) already described in the principal patent.

According to the invention, tubular sleeve (1) is attached to rigid assembly (2) forming the end of the device. To achieve this attachment, ends (4.1), (4.2), (4.3), and (4.4) of the layers or layer pairs (4) are engaged in the conical annular space between the coaxial supporting elements (5) and gripping elements (6), with supporting element (5) and gripping element (6) having compression surfaces opposite each other and limiting the conical space diverging toward the ends of layers (4).

In this embodiment, a third rigid element (7) and a fourth rigid element (8), which are wedge-shaped, are driven in axially, respectively between ends (4.3) and (4.4) and ends (4.1) and (4.2) of the pairs of reinforcing layers (4) such as to compress these ends respectively against supporting elemnt (5) and gripping element (6) pressing against one another through the intermediary of ends (4.2) and (4.3) compressed against one another in the central part of the conical space between supporting element (5) and gripping element (6). The compressing surfaces of the wedges, as for example the compressing surfaces of wedge 8 with layers (4.3) and (4.4) could have notches, ribs, or roughnesses able to increase adhesion and interlocking of the layers at these surfaces.

According to the invention, the compressing surface between supporting element (5) and end (4.4) of armature (4) on the one hand and the compressing surface between gripping element (6) and end (4.1) of armature (4) on the other hand, are rendered nonadhesive to materials such as, for example, the rubber with which layers (4) of the armature are impregnated.

Ends (4.1), (4.2), (4.3) and (4.4) of the layers of armature (4) are denuded, before their placement in the conical compression space, of the outer rubber layer with which the cables forming these layers are generally coated. This provides a direct contact between the cables and the compressing surraces, such as to enhance the effectiveness of said compression.

With this arrangement, any tractive force exerted on armature (4) by reason of application of an inflation pressure tends to pull wedges (7) and (8) in their driving direction between supporting element (5) and gripping element (6), and thus to produce self-locking of ends (4.1), (4.2), (4.3), and (4.4) of the reinforcing layers between the corresponding conical surfaces. This self-locking is considerably improved by the nonadhesion of the conical surfaces belonging to supporting element (5) and gripping element (6) which are rendered integral with end piece (2) by linking means such as threads (9) and (10). As a result ofthe arrangement of wedges (7) and (8) and their adhesion to ends (4.1), (4.2), (4.3), and (4.4) and of the presence of the slits described hereinbelow, they act together and separately following the same principle as the invention described in the principal patent, having the additional advantage of adapting to a larger number of layer pairs.

According to the invention, an arrangement with two layer pairs and two coaxial wedges conforms to the description of FIGS. 2, 3, and 4 wherein FIG. 2 is a partial representation of a wedge seen from its external lateral face, and FIG. 3 completes this description by a section a—a of the arrangement of FIG. 2, in the neutral position, as comes about, for example, when the device is installed. Balancing slits such as (11) and (12) are arranged in pairs, offset by 120° for example, such as pairs (11) and (12), (13) and (14), or (15) and (16) in wedge (7).

Each pair of slits like (11) and (12) is made by machining the cone, one slit being offset with respect to the other, both position-wise and depth-wise, such as to leave a strip of material (17) between said slits whose length and cross section are chosen such as to permit deformation resulting from the enlargement or shrinking of the slits while the cones are being installed or their reaction during compression between the supporting element and the gripping element. The effective width of the slits is between 1 and 3 mm, the sum of the depths of the slits of one pair being preferably 5 to 10 mm greater than the length represented by the normal distance between the vertex and the base of the cone. Preferably, strip section (17) is between 20 and 50 mm² in cross section. According to the invention, a set of two wedges is mounted such as to offset the pairs of slits of the inner wedge with respect to the pairs of slits of the outer wedge by a half-angle defining the angular spacing of the slit pairs of the inner wedge; thus the risk of superimposition of slit pairs of one or more coaxial wedge is avoided.

FIG. 4 shows the respective positions of sections a—a of two wedges such as (7) and (8) after balancing the compression between the supporting and gripping elements. Under the influence of said compression, the slits of wedge (7) are closed which, by reduction of the circumference of the wedge cross section, is equivalent to an axial contraction of said wedge. At the same time, and under the influecne of the same compression, wedge (8) is caused to expand, for example, which corresponds to radial expansion and spreading of the balancing slits. This arrangement has an important advantage due to the additional compressive effect on the layers which are inserted in space (18) between the two wedge (7) and (8). As a result, the device described improves the performances of the system described in the principal patent, in particular for medium- or small-diameter hoses and for a number of layer pairs equal to or greater than 2.

FIG. 5 shows in the cross section at the bottom a device according to the invention with two wedges in the resting position, while the upper cross section shows the same device in the operating position, in the inflated state, packing a pipe (19). According to this embodiment, wedges (7) and (8) are notched to improve their interlocking with the layers ad ensure their perfect entrainment by the latter under the influence of force exerted by pressure. Space (20) between the ends of layers (4.1) to (4.4), the bases of wedges (7) and (8), and end piece (2) is filled with an elastomer filler ensuring perfect tightness of the device against penetration of any fluid between layers (4.1) to (4.4) and wedges (7) and (8). The conical compression surface (21) of supporting element (5) and surface (22) of gripping element (6) have been coated, before installation, with an antiadhesive product such as, as a nonlimitative example, Teflon aerosol. Wedges (7) and (8), which are coaxial, have symmetrical sections with respect to the cylindrical surface defined between layers (4.2) and (4.3) such that the total angle at the vertex is approximately 20°. The individual skilled in the art can, of course, make various modifications to the device described above and its applications illustrated as nonlimitative examples, wihtout departing from the scope of the invention.

We claim:

1. A flexible, elastic hose device, comprising at least one rigid end piece and a hose that is reinforced by at least two pairs of adjacent reinforcing layers made of flexible cables disposed helically and that is fastened at at least one end by compression of said at least two reinforcing layers against said rigid end piece, said rigid end piece comprising an inner supporting element and an outer gripping element, said inner supporting element and said outer gripping element being coaxial and having conical compression surfaces which diverge toward said at least one end; and at least one wedge arranged between said adjacent reinforcing layers of each pair at said at least one end to compress said at least adjacent two reinforcing layers between said at least one wedge and, respectively, said inner supporting element and said outer gripping element, wherein said conical compression surfaces are in contact with and are non-adhesive to surfaces of said at least two adjacent reinforcing layers; and wherein said at least one wedge is provided with at least two slits, said two slits being offset with respect to each other in opposite directions and extending through said wedge so as to define a strip therebetween, thereby producing a self-locking effect at said at least one end.

2. Device according to claim 1, characterized by said reinforcing layers being disposed in pairs, and by the ratio of the number of wedges to number of pairs of reinforcing layers being 1 wedge per pair of reinforcing layers.

3. Device according to claim 1, characterized by each of said at least one wedge having conical compression surfaces and a vertex angle between 5° and 15°.

4. Device according to claim 1, characterized by the slope angle between said conical compression surfaces of said inner supporting element and said outer gripping element being between 5° and 20°.

5. Device according to claim 1, characterized by said inner supporting element and said outer gripping element being integrated with each other in the axial direction.

6. Device according to claim 1, characterized by each of said at least one wedge having pairs of axially disposed slits separated by a strip.

7. Device according to claim 6, characterized by the number of pairs of axially disposed slits being 3 per wedge, wherein the width of each slit is between 1 and 3 mm.

8. Device according to claim 1, characterized by said conical compression surface of said inner supporting element and said conical compression surface of said outer gripping element having an antiadhesive coating.

9. Device according to claim 2, characterized by the number of wedges being equal to two and the number of reinforcing layers being equal to four.

10. Device according to claim 1, wherein said reinforcing layers are made of flexible cables impregnated with rubber.

11. Device according to claim 10, characterized by the portion of said at least two reinforcing layers in contact with said conical compression surfaces at said at least one end having no coating of rubber interposed between said flexible cables of said at least two reinforcing layers and said conical compression surface.

12. Device according to claim 7, comprising two coaxial wedges.

13. Device according to claim 8, wherein said antiadhesive coating is made of Teflon.

14. Device according to claim 1, wherein said at least two reinforcing layers are provided in pairs of adjacent reinforcing layers and a wedge is provided between the adjacent reinforcing layers of each pair at said at least one end.

15. A flexible, elastic hose device, comprising at least one rigid end piece and a hose that is reinforced by at least two pairs of adjacent reinforcing layers made of flexible cables disposed helically and that is fastened at at least one end by compression of said at least two reinforcing layers against said rigid end piece, said rigid end piece comprising an inner supporting element and an outer gripping element, said inner supporting element and said outer gripping element being coaxial and having conical compression surfaces which diverge toward said at least one end; and at least one wedge arranged between said adjacent reinforcing layers of each pair at said at least one end to compress said at least two adjacent reinforcing layers between said at least one wedge and, respectively, said inner supporting element and said outer gripping element, wherein said conical compression surfaces are in contact with and are non-adhesive to surfaces of said at least two adjacent reinforcing layers; and wherein each of said at least one wedge is provided with pairs of axially disposed slits separated by a strip, thereby producing a self-locking effect at said at least one end; each of said at least one wedge having conical compression surfaces, a base and a vertex, one slit of each of said pairs of slits extending from said vertex of said wedge toward said base, another slit of each said pairs of slits extending from said base of said wedge toward said vertex, the length of each of said one slit and said another slit being less than the distance between said vertex and said base and the sum of said lengths of said one slit and said another slit being greater than said distance between said vertex and said base.

* * * * *